United States Patent Office 3,312,265
Patented Apr. 4, 1967

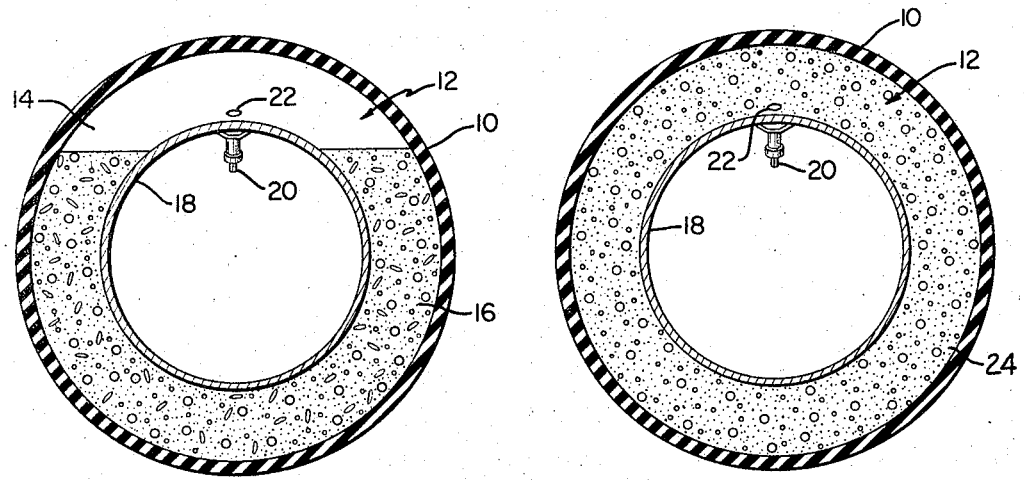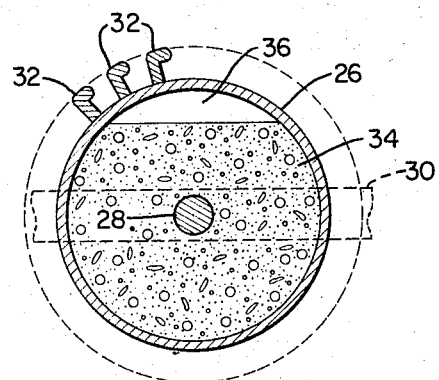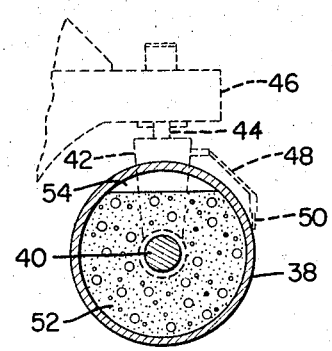

3,312,265
BALLASTED VEHICLE SUPPORT MEANS AND BALLAST THEREFOR
Roscoe E. Turner, Littleton, and N. A. Leuker, New Raymer, Colo., assignors of twenty percent to Philip H. Sheridan and twenty percent to Kermith F. Ross, both of Denver, Colo., and twenty percent to Duane C. Burton, Boulder, Colo.
Filed Jan. 29, 1965, Ser. No. 428,619
9 Claims. (Cl. 152—330)

This invention relates generally to a ballast and the combination of such ballast with a vehicle support means, and more particularly to a ballast which can be easily and quickly loaded into and out of vehicle support means including a tire, which has a density that may be varied as desired or required, and to a vehicle support means including a tire in combination with such ballast whereby the chamber of said support means may be partially or completely filled with said ballast and a predetermined amount of gas without adversely affecting the smooth rolling thereof and, where a tire is involved, without adversely affecting the pneumatic effect or riding qualities of a tire so ballasted.

A problem in any prime mover which is required to pull heavy loads, such as a farm tractor or earth moving equipment, has been to obtain sufficient weight upon the traction wheels to provide adequate drawbar pulling power. It is commonly known that the coefficient of friction between rubber tires and the surface over which they travel, such as an unplowed field, is about 0.5. This means that for every pound of weight on each rear wheel of the tractor, the tractor will exert a pull of up to 0.5 pound in a horizontal direction. On hard surfaces, such as concrete, the coefficient of friction will be as high as 0.6, while on sandy ground the coefficient of friction may drop as low as 0.25 to 0.3. Thus, the pulling power of rubber tired equipment under such conditions is substantially reduced. As a matter of fact, where traction is very poor, it has been customary to use a crawler track type tractor since its coefficient of friction is about 1.0 on many surfaces which means that for a given tractor weight much heavier loads can be pulled. However, the crawler type tractors are disadvantageous since they must be operated at substantially reduced speeds as compared to wheel type tractors.

Heretofore, to obtain added weight on the rear wheels of a farm or industrial tractor as well as other earth moving equipment, it has been common practice to add cast iron weights to the rear wheels or pump liquid into the tires or to fill partially the tire with a powder-like material. Although each of these approaches can, under varying circumstances, produce an overall beneficial result, it has been found that the adding of extra weight to a tractor or earth moving equipment in any of these manners suffers from certain disabilities. For example, the amount of weight that can be added to a tractor or the like through the use of cast iron weights is limited to that amount of weight which will not overload the gear train assembly; additionally, in many instances, the installation and removal of such weights pose serious and difficult handling problems in the field. The pumping of liquids, such as a mixture of calcium chloride and similar salts with water, into the tires has proven disadvantageous since partial filling of the tire results in the low viscosity liquid moving back and forth easily in the tire while in operation thereby producing surging movements which bring about an unbalanced dragging or loping movement whereas a complete filling of the tire resulted in a tire which had lost substantially all of its resilient characteristics and which produced undesirable or hard riding qualities. Additionally, such liquids are normally corrosive in nature, may freeze, and upon puncture of a tire cause sterilization of a large patch of land. A vehicle tire partially filled with a powder material overcame some of the disadvantages associated with the use of a liquid in the tire but involved such serious handling problems, i.e., loading into and out of the tire as well as "balling" up within the tire, that same has never achieved any significant commercial acceptance. For example, although the powder can be loaded into a tire without too much difficulty, it can not be entirely removed therefrom without separating at least the rim from one of the beads of the tire; additionally, a conglomerating or balling up of powder caused the tire to operate in an imbalanced condition. Further, the complete filling of a tire with such a powder ballast was disadvantageous since, as is the case for a tire completely filled with a liquid, the tire no longer exhibited any of the resilient characteristics associated with a pneumatic tire.

It has been discovered, however, that use within a tire of a ballasted material comprising a finely divided powder and a resilient material in particle form in which said resilient material constitutes, by volume, 3% or more of said ballast material overcomes the disadvantages heretofore existing with the use of prior art ballast materials. Further, beneficial and completely satisfactory results have been obtained with the use of such a ballast material both for partially filled and completely filled tires. A tire containing this particular type of ballast may be completely filled without adversely affecting the pneumatic or riding qualities thereof since the resilient material quickly and easily compresses under impact thereby maintaining the resilient qualities of the tire. It has also been found that the quantity of resilient material in particle form may be varied to control the overall density of the ballast material but without adversely affecting the otherwise beneficial results obtained from the use of such ballast material. It has additionally been discovered that a light weight, granular material such as millet seed may be used in combination with such ballast material to produce equally beneficial results as well as increase the lubricity of the ballast material and assist in physically disintegrating any balled-up portions of the ballast material. Further, it has been discovered that the use of small quantities of metal particles assists in dissipating charges of static electricity.

Accordingly, one of the principal objects of this invention is to provide an improved ballast material for resilient vehicle tires and support means for vehicles.

Another object of this invention is to provide an improved ballast material which may be easily and quickly loaded into as well as out of a resilient vehicle tire.

Another object of this invention is to provide an improved ballast material which may be used to fill completely a tire without adversely affecting the pneumatic and riding qualities thereof.

Another object of this invention is to provide an improved ballast material which substantially increases the life of a tire in which same is used.

Another object of this invention is to provide an improved ballast material comprising a finely divided powder and a resilient material in particle form, said resilient material forming, by volume, 3% or more of said ballast material.

Another object of this invention is to provide an improved ballast material comprising a finely divided powder, a resilient material in particle form and a granular material having smooth-surface portions and constituting, by volume, up to 50% of said ballast material.

Another object of this invention is to provide a vehicle tire completely filed with an improved ballast while maintaining the desirable resilient characteristics of said tire.

Another object of this invention is to provide a ballast material which exhibits better lubricating properties and flows easier than prior art powder ballast materials.

Another object of this invention is to provide a vehicle tire partially or completely filled with an improved ballast which not only retains its resilient qualities but also rolls smoothly even at relatively high speeds.

Another object of this invention is to provide a vehicle tire filled with a light weight ballast, said ballast comprising a resilient material in particle form.

Another object of this invention is to provide a vehicle tire partially or completely filled with an improved ballast in combination with a dry pressurized gas.

Another object of this invention is to provide a resilient vehicle tire in combination with a dry gas and a ballast material comprising a finely divided material and a resilient material in particle form, said resilient material constituting by volume, 3% or more of said ballast material.

Another object is to prevent the accumulation of large amounts of static electricity.

Other objects and advantages of this invention will become readily apparent from a reading of the following description and a consideration of the related drawings wherein:

FIGURE 1 is a vertical cross-sectional view of a tire partially filled with a ballast material;

FIGURE 2 is a vertical cross-sectional view of a tire completely filled with a ballast material;

FIGURE 3 is a cross-sectional side elevational view of a sheep's foot roller illustrating an at rest condition of such roller partially filled with a composition according to the invention; and FIGURE 4 is a cross-sectional view of an asphalt roller showing the condition of a ballast material of the invention in at rest position.

Referring now to the drawings, in FIGURE 1 is shown a resilient or rubber tire 10 provided with an annular chamber 12 having at the upper portion thereof an air or gas space 14 in which may be disposed, when the tire is at rest, a pressurized gas. The remainder of the chamber is filled with a dry, particulate ballast 16 comprising a finely divided powder of varying size, a resilient material in particle form and a granular material such as millet seed. The finely divided powder, resilient material and granular material are intermixed with each other. The rubber tire 10 is shown to be supported on a rim 18 and has a valve 20 communicating with the annular chamber 12 of said tire through an opening 22.

In FIGURE 1, the ballast is shown in a settled condition, i.e., where the particulate mass contains only a minimum quantity of occluded air. The settled ballast in this condition is quite solid to the touch. This condition is approached by tapping the tire with a hammer to permit the occluded air to pass up through the mass to the top part of the chamber 12. The settled material fills from 65% to 100% of the volume of the chamber 12. After the tire is filled with the desired amount of ballast, gas under pressure is introduced into the tire to the normal operating pressure of the tire. It is preferred that the tire to be pressurized with a dry gas in order to eliminate further the tendency of the finely divided material to conglomerate into balls. It has been noted that such tendency has been greatly reduced through the use of the resilient material in particle form and/or the granular material since said materials increase the lubricity of the ballast material thereby preventing the balling up of the finely divided material and the granular material assists, during agitation of the ballast material which occurs through rotation of the tire, to reduce to its original form any conglomeration of the finely divided powder that might occur. On rotation of the tire, usually 2 or 3 revolutions is all that is necessary, the ballast material is agitated and becomes uniformly dispersed or distributed throughout the entire annular chamber 12. In this condition, the tire retains essentially all its pneumatic characteristics particularly that of being capable of flexing under bumps and the like and flattening under pulling loads.

The ballast material contained within the tire of FIGURE 1 comprises a finely divided powder, a resilient material in particle form and a granular material, such as millet seed, having substantial smooth-surfaced portions. The finely divided powder comprises a mixture of powder particles ranging from 10 mesh to 85 mesh and finer. In order to minimize abrasive action on the inner surface of the tire or tube, it is preferred that a maximum range of powder size be limited to 15–30 mesh range and that the smaller mesh size of the powder be in the range of 95 mesh or finer. In order to insure that the pressurized gas contained within the chamber 12 becomes effectively occluded within the ballast material so that substantially all of the ballast material becomes an air-borne fluid and substantially fills the chamber 12, it has been found that for a partially filled tire 10%, and preferably 20%, of the ballast material must comprise a finely divided powder having a fineness of 85 mesh or finer and preferably 95 mesh or finer. The coarse particles of the finely divided powder may be of the same composition as the fine particles of said powder or it may be of a different composition. The powder material may consist of such suitable materials as silica, limestone, shale and clay, barite and barium sulphate. Additionally, it is preferred that such material be essentially moisture free when installed in the tire, preferably non-hygroscopic, and exhibit lubricity properties which facilitate the particles flowing past each other and other materials contained in the ballast.

The resilient material in particle form may be selected from any number of materials such as rubber, rubber-like compositions, and plastic foam. The resilient material is preferably spheroidally shaped having a diameter up to approximately one-fourth inch although a particle size of approximately one-eighth inch is preferred. The resilient material may also be oblong or oval in shape in which the maximum diameter varies up to approximately one-fourth inch although a particle size of approximately $1/8''-3/16''$ is preferred. It has been found that the lesser the density of resilient material involved the greater may be the size of the particle without adversely affecting the qualities of the ballast material. It has also been found that the rubber particles obtained from removing excess rubber from a tire which is to be retreaded or recapped may be used to good advantage. In the trade, such rubber particles are known or referred to as "buffer" dust.

It has also been found that polystyrene particles which have been heat expanded constitute another good source for such resilient material. Where a tire is completely filled, the particle size of such resilient material is not as important as for a partially filled tire and the dimensional limitations may be relaxed somewhat.

The use of a resilient material in particle form has been found to be advantageous for a number of reasons. For example, such particles provide a relative large projected surface area, as compared to the size of the powder particles, upon which pressurized gas or a vacuum may exert a considerable force to drive the resilient material particle and any adjacent powder particles in a desired direction. This feature is particularly advantageous in loading a ballast material into and out of a tire. Further, the use of a resilient material in particle form incorporates into the ballast material a plurality of energy sinks or energy reservoirs. By this it is meant that energy may be stored within the ballast mass as a result of compressing the individual particles of resilient material. Upon agitation of the ballast, which occurs through rotation of the tire, this energy is quickly released to the ballast material thereby resulting in further agitation of the ballast mass and occlusion of air therein. Very good results been obtained where the resilient material has been selected from the class consisting of rubber, rubber-like compositions and plastic foams. In addition to the foregoing, it has been found that the incorporation into a ballast material of resilient material in particle form increases the overall lubricity between the materials incorporated within the ballast mass thereby facilitating the handling of such ballast material, particularly during loading into and out of a tire.

The granular material contemplated to be incorporated into the ballast material of this invention has substantial smooth-surfaced portions and preferably one or more sharp points formed on the surface thereof. Such material has a density substantially less than that of the finely divided powder and is usually less compressible as compared to the resilient material. Additionally, such granular material preferably should possess qualities of non-brittleness. Further, it has been found that the maximum diameter of such granular material should not exceed approximately one-fourth inch.

The use of a granular material in a ballast material of this invention is advantageous for a number of reasons. For example, since the density of the granular material is substantially less than that of the finely divided powder, the overall density of the ballast material may be easily and accurately controlled through the use of this granular material. This is advantageous where, for a given tire size, a smaller amount of weight might be required for one soil condition than for another such as exists between wheat farming and rice farming. Additionally, the overall lubricity characteristics of the ballast material is enhanced by the use of a granular material having substantially smooth-surfaced portions. Further, the tendency of a ballast material to conglomerate or ball-up either as a result of static electricity or the existence of moisture within the tire chamber has been greatly minimized or eliminated through the use of a granular material having sharp pointed surface portions. Such sharp pointed surface portions not only facilitate the dissipation and transfer of concentrated charges of static electricity but also assist in the physical disintegration of conglomerated portions of the ballast material. Also, such granular material, during rotation of the tire, does not collect or settle out of the ballast material but remains dispersed and intermixed therein.

In many instances it has been found that undesirable charges of static electricity have been generated. It has been discovered, however, that the tendency for large quantities of static energy to become concentrated can be greatly reduced or entirely eliminated through the incorporation within the ballast material of small quantities of metal filings, i.e., between approximately one-half to five pounds per ton of ballast material. The size of the metal filings or particles should be in the same range as the size of the finely divided powder and probably within the lower or smaller size portion of such range.

A tire partially filled with the ballast material of this invention should have at least approximately 65 percent of the chamber thereof filled with ballast material and preferably 85 percent or more of the chamber capacity should be filled with ballast material. As previously indicated, excellent results have been obtained when the tire chamber is approximately 100 percent filled with ballast material, i.e., between approximately 98 percent and 100 percent full. As a matter of fact, due to the difficulty in ascertaining accurately the degree to which a tire has been filled, for uniformly good performance it has been found desirable to fill the tire completely full, i.e., as full as can be done in the field which is approximately 98 percent or more full. A ballast material having a finely divided powder and a resilient material in particle form wherein said resilient material comprises, by volume, three percent or more of said ballast material, and preferably between approximately 20% and 60%, has been found to be effective and beneficial in use. Excellent results have been obtained where the ballast material incorporated between approximately 40% and 55% of said resilient material. In a number of applications for a partially filled tire it has been found that the overall weight of the ballast mass is the controlling factor thereby necessitating the use of a smaller proportion of resilient material such as between approximately 3% and 15%. The ratio between the finely divided powder and the resilient material is based upon volume, and this volume is measured prior to the intermixing thereof. As a matter of fact, it has been found that one unit of resilient material intermixed with one unit of finely divided powder will produce a mixture having a volume quite a bit less than two units. It will also be understood that a ballast material comprising a finely divided powder intermixed with a resilient material in particle form provides effective and beneficial results and that such a ballast material may be used with or without the addition of a granular material such as millet seed and with or without a small quantity of metallic powder.

Where a partially filled tire is involved, the quantity of granular material, such as millet seed, to be incorporated within the ballast material may vary over a wide range. From a density viewpoint, the amount of granular material to be used will depend upon the overall density of the ballast material desired. However, for improved lubricity properties of the ballast material, it has been found the minimum of approximately two percent, by volume, is required. Larger quantities of granular material, preferably five percent or more, by volume, are required to assist in the physical disintegration of a conglomerated portion of the ballast material. As a normal rule, except for special situations, seldom is more than 50 percent, on a volume basis, of the ballast mass formed from this granular material. As specified above, with respect to the resilient material the same measurement criteria applies with respect to the volume and ratios of the granular material to the ballast material.

Referring now to FIGURE 2, a resilient vehicle tire 10 provided with an annular chamber 12 is shown filled with a ballast material 24. Annular chamber 12 also has a pre-determined quantity of pressurized gas disposed therein to occupy the void area between the intermixed particles of said ballast. The ballast material comprises a finely divided powder and a resilient material in particle form intermixed with said powder. Alternatively, where very small quantities of ballast weight are required, said ballast material may comprise only a resilient material in particle form. It will be understood, however, that either of the two aforementioned ballast materials may also include a granular material such as millet seed and/or a small quantity of finely divided metallic particles.

The criteria set forth above with respect to each of the materials incorporated into the ballast material of FIGURE 1 applies generally to the ballast of FIGURE 2 insofar as each material is concerned. However, where the tire is completely filled, the fineness of the finely divided powder is not as critical from an air entrainment or occulsion-of-air viewpoint but is still important from an abrasion-of-the-inner-surface-of-the-tire or tube viewpoint. Additionally, the mixture ratios are not as critical from an operation viewpoint but are important from a handling and loading viewpoint. Thus, although the ratio of mixture requirements and the particle size requirements can be relaxed somewhat for tires substantially filled with ballast, in actual practice it has been found to be desirable and beneficial to retain these requirements essentially unchanged from those as specified above with respect to the ballast described in connection with FIGURE 1.

Referring now to FIGURE 3, a sheep's foot roller is shown consisting essentially of a rigid, metal skin 26 in a hollow cylindrical shape closed at both ends (not shown) and having an axle 28 mounted in bearings (not shown) secured in the ends, as in the common practice. The axle 28 is journaled in a yoke or other supporting mechanism, part of which is shown at 30. To complete the sheep's foot roller, a series of feet 32 extend around the peripheral extent of the drum and lengthwise thereof, three only being shown, but it is understood that such feet extend completely around the drum. Ballast material 34, which is a composition according to the invention described above either with respect to FIGURE 1 or FIGURE 2, fills from 65% to 100% of the volume of the drum leaving a space 36 for air where the drum is not completely filled with said ballast material 34.

Referring now to FIGURE 4, an asphalt roller is shown comprising a metal skin 38 which is in the shape of a hollow cylinder having ends (not shown) supporting bearings (not shown) for an axle 40. The axle 40 is mounted in a yoke 42 or other support which is rotatably mounted by means of a shaft 44 in a framework 46 so that the roller may be steerable by mechanism, not illustrated but may be such as is commonly used in the industry. Such rollers are normally utilized with hot asphalt and a conduit 48 terminating in one or more nozzles 50 provide cooling water to be sprayed on the metal skin 38 of the cylinder. The cylinder is filled in a manner similar to the drum of FIGURE 3, i.e., between approximately 65% and 100% of the volume of the cylinder. Where the ballast material 52 does not completely fill the cylinder, an air space 54 exists above the ballast material 52.

Where the drum or cylinder of the apparatuses of FIGURES 3 and 4 are not completely filled when at rest, agitation of the ballast material contained within said drum and cylinder, such agitation occurring upon rotation thereof, results in the ballast material becoming air-borne thereby completely filling the drum or cylinder and maintaining said drum or cylinder in a balanced condition during operation thereof. Since the operation of the ballast material contained within the drum and cylinder shown in FIGURES 3 and 4 is essentially the same as the ballast material contained within the tires shown in FIGURES 1 and 2, except for the flexibility of the surface of the tire, reference may be had to the aforementioned description for a complete understanding of the operation involved herein with respect to FIGURES 3 and 4.

From the foregoing description, it will be readily apparent that a new and improved ballast material for use with resilient vehicle tires and a rigid drum or cylinder has been described. For example, the use of a ballast material as described herein in a resilient vehicle tire enables the precise and accurate control of the way the material should be installed in the tire, greatly facilitates the loading of ballast into and out of the tire, enables complete unloading of the ballast material from within a tire without "breaking down" the tire from the rim, does not overload the gear train system, increases the life of the tires, increases the traction available from a vehicle utilizing such ballasted tires through a substantial reduction of slippage between the tire and the surface upon which it rolls, and reduces casing breaks in the tire because the ballast, although compressible, resists large deformation of the tire casing.

The use of a ballast material as described in a vehicle support means including a rigid drum or cylinder in which said container is filled between approximately 65% and 100% and preferably between approximately 85% and 100% permits smooth, even operation of such drum or cylinder. Further, the use of a ballast as described herein overcomes the loading and unloading problems occurring with the use of prior art powder ballasts since although pressurized gas may effect an opening through the powder, at the same time it exposes the surfaces of larger size particles such as the resilient material and the granular material and thereby results in a force being applied to such particles which in turn is transmitted to the finely divided powder causing the powder to flow in the desired direction.

Although the illustrative embodiments of the invention herein set forth have been described in detail to make a full disclosure of the invention, it is to be understood that the particular apparatuses and ballast materials as described are intended to be illustrative only, and that the various features of the invention may be incorporated in other forms without departing from the spirit and scope of the invention as defined in the subjoined claims.

What is claimed is:

1. A ballasted vehicle tire comprising a resilient vehicle tire having an annular sealed chamber inflatable with gas under pressure, a ballast material filling said chamber between approximately 65% and 100% of its capacity when the tire is at rest, gas maintained within said chamber under pressure to inflate said tire, said ballast material including a finely divided powder, a resilient material in particle form and a granular material having substantially smooth-surfaced portions, said powder having a portion thereof having a fineness of 95 mesh or finer and forming, by volume, at least about 20% of said ballast material, said resilient material forming, by volume, at least about 3% of said ballast material, said granular material having a density substantially less than that of said powder and forming, by volume, up to 50% of said ballast material.

2. A ballasted vehicle tire as described in claim 1 in which said ballast material fills said chamber between approximately 85% and 100% of its capacity when the tire is at rest.

3. A ballasted vehicle tire as described in claim 2 in which said resilient material is selected from the class consisting of rubber, rubber-like compositions, and plastic foam.

4. A ballasted vehicle tire as described in claim 2 in which said resilient material constitutes, by volume, between approximately 3% and 60% of said ballast material.

5. A ballasted vehicle tire as described in claim 2 in which said resilient material constitutes, by volume, between approximately 20% and 60% of said ballast material.

6. A ballasted vehicle tire as described in claim 3 in which said resilient material constitutes by volume, between approximately 40% and 55% of said ballast material.

7. A ballasted vehicle tire as described in claim 2 in which said gas is substantially moisture free.

8. A ballast material for resilient vehicle tires comprising a finely divided powder, a resilient material in particle form, and a granular material having substantially smooth-surfaced portions, said powder having a portion thereof having a fineness of 95 mesh or finer and forming, by volume, at least about 20% of said ballast material, said resilient material forming, by volume, at least about 3% of said ballast material, said granular material having a density substantially less than that of said powder and forming, by volume, up to about 50% of said ballast material.

9. A ballast material as described in claim 8 in which said resilient material forms, by volume, between approximately 20% and 60% of said ballast material and in which substantially every particle of said granular material has at least one sharp-pointed surface portion.

References Cited by the Examiner

UNITED STATES PATENTS 3,003,536  10/1961  Culbertson et al. _____ 152—330
3,008,506  11/1961  Hicks _____ 152—330

FOREIGN PATENTS 926,760    5/1946  France.
1,215,492  2/1959  France.

ARTHUR L. LA POINT, *Primary Examiner.*

C. W. HAEFELE, *Assistant Examiner.*